July 28, 1942.    L. OLIVIERI    2,291,099
METHOD OF MAKING TOOTHED BARS
Filed Feb. 10, 1940
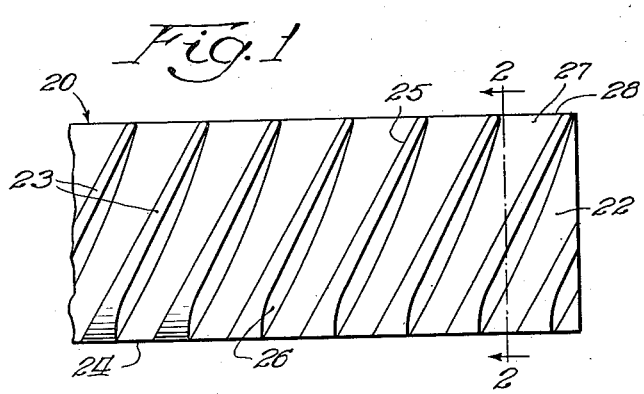
Fig. 1
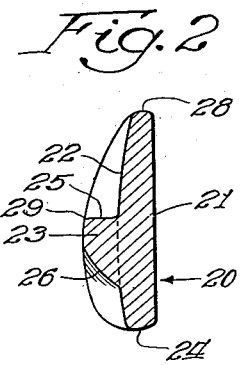
Fig. 2
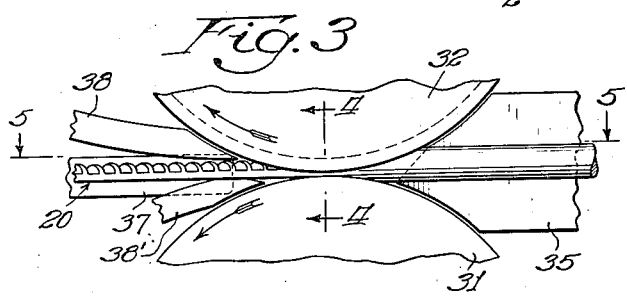
Fig. 3
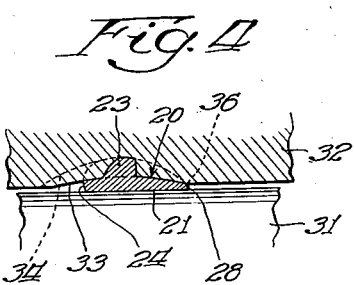
Fig. 4
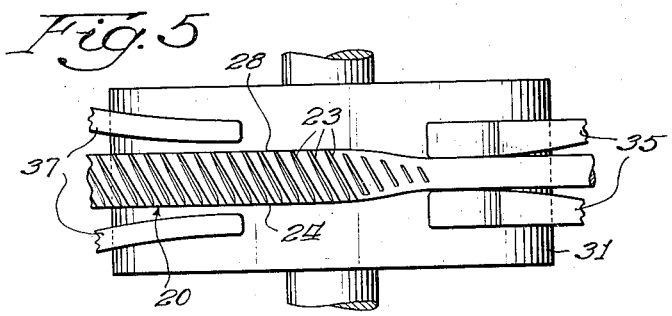
Fig. 5
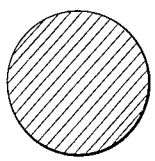 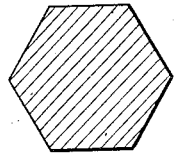 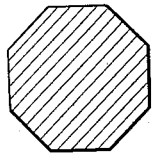 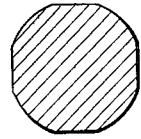 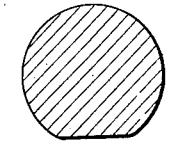
Fig. 6   Fig. 7   Fig. 8   Fig. 9   Fig. 10
Inventor:
Louis Olivieri
By: Edward C. Gritzbaugh
Atty.

Patented July 28, 1942

2,291,099

UNITED STATES PATENT OFFICE 2,291,099

METHOD OF MAKING TOOTHED BARS

Louis Olivieri, Chicago Heights, Ill., assignor to Borg-Warner Corporation, Chicago, Ill., a corporation of Illinois Application February 10, 1940, Serial No. 318,261

2 Claims. (Cl. 80—60)

This invention relates to a method of forming a toothed bar wherein the teeth are disposed at an angle to the sides of the bar.

For purposes of illustration, this invention will be described with reference to a bar used in farm implements for threshing and shelling crops and variously known as a cylinder bar, beater bar, rub bar or rasp bar. It consists essentially of a length of steel disposed transversely of the path of the crop through the implement and mounted upon a rotatable support. There are usually six such bars mounted on the support. The bars cooperate with a concave grating which is spaced a short distance away from the bars. The bars are provided with teeth on the outer surfaces thereof, the teeth being disposed at an angle to the sides of the bar. The teeth of adjacent bars slant in opposite directions, thereby imparting a substantially circular motion to the crop as it passes through the machine.

The teeth of the bar are unsymmetrically shaped both in cross section and in a longitudinal direction, the leading edges of the teeth being narrow and broadening out towards the rear, and the work surface being formed at right angles to the surface of the bar to provide a fairly sharp edge for stripping the crop from the straw or pod.

Because of the irregular shape of the teeth, such a bar has been considered very difficult to make. It would obviously be too expensive to form the bar by machining the teeth. It has been attempted to form the bar by forging operations, but such operations are limited in the length of bar to which they can be applied and are in general more time consuming. The desirability of forming the bar by a rolling operation has been appreciated for some time, but to my knowledge no suitable rolling method and apparatus have been devised prior to the one herein described.

The object of this invention, therefore, is to provide a method of forming toothed bars such as cylinder bars and the like which will be rapid, economical and reliable.

I have discovered that a toothed section such as a cylinder bar can be successfully rolled economically provided two conditions are met. The first condition is that the starting section be a regular closed figure, preferably a circle, and the second condition is that the bar be rolled in an open pass so that the material will be free to flow laterally as it is being compressed between the rolls.

The invention will become apparent from the following description when taken together with the drawing which forms a part thereof, and in which:

Fig. 1 is a plan view of a fragment of a cylinder bar;

Fig. 2 is a section through the bar of Fig. 1 taken along lines 2—2;

Fig. 3 is a fragmentary side elevation of the rolls and guides showing a bar in the process of formation;

Fig. 4 is fragmentary transverse section through the upper roll and the bar taken along line 4—4 of Fig. 3;

Fig. 5 is a plan view of the bar and rolls with the upper roll removed showing the change in the shape of the bar; and Figs. 6 to 10 inclusive show various sections which have been found to be satisfactory as starting sections.

Referring now to Figs. 1 and 2, the cylinder bar 20 is comprised of a strip of steel having a substantially flat face 21 on one side, and a slightly convex face 22 on the opposite side upon which are located raised teeth 23. As shown in Fig. 1, the teeth 23 are at an angle to the sides of the bar and are inclined to the right. The bar illustrated would be called a left-hand bar. It is understood that the invention is applicable to a right-hand bar equally as well, and that to simplify the description a right-hand bar is not shown.

As viewed in Fig. 2, it will be seen that teeth 23 are not symmetrical in a longitudinal direction, but resemble somewhat an air foil section having a greatest depth approximately one-third of the distance from the lower edge 24 of the bar. It will also be observed that the cross section of the tooth is likewise unsymmetrical, having a face 25 which is at right angles to surface 22 of bar 20 and a sloping curved face 26. This shape of tooth results in a relatively wide spacing 27 at the leading edge 28 and a progressively restricted spacing toward the opposite edge 24. Face 25 of tooth 23 is the working face, and in theory the grain is stripped from the straw by corner 29. For this reason corner 29 is required to be sharp.

It will be readily appreciated that because of the irregular shape of the bar the flow of the metal when compressed between rolls cannot be readily predicted and for this reason such bars have not been rolled rapidly and economically to my knowledge. The prediction of the movement of the metal is further complicated by the fact that due to the oblique disposition of the teeth, the metal tends to rotate about its own axis as it passes between the rolls, the direction of rotation corresponding to the direction of the slant of the teeth with respect to the sides of the bar. For example, the bar shown would tend to rotate counter-clockwise as it approached the rolls, and a right-hand bar would tend to rotate clockwise. The normal procedure for rolling such a bar would be to use a closed pass in order to make sure that the contour of the tooth would be correct, and to start with a bar approximating the cross-section of the finished bar.

I have discovered, however, that the cylinder bar cannot be rolled successfully in a closed pass, and, further more, that it is not necessary to start with a section which approximates the finished section, but that the bar can readily be rolled in a single heat from standard and readily available regular polygonal sections. Thus, if the starting section is a round, and the rolls define an open pass, the tendency of the material to rotate as it approaches the pass creates no difficulty because of the symmetrical nature of the starting bar, and the open pass permits the metal to flow laterally where it will and yet does not result in an unduly serrated or scalloped edge despite the fact that the metal is not guided.

Examining now Figs. 3 to 5 inclusive, the apparatus by which bar 20 is formed comprises a pair of rolls 31 and 32 which are mounted in a rolling mill (not shown) of the usual form, and driven in the direction of the arrows. Roll 31 is a smooth cylindrical roll, and roll 32 is a contoured roll. The contour in roll 32 comprises a shallow groove 33 extending peripherally of the roll and coinciding in form with surface 22 of bar 20. At spaced intervals in shallow groove 33 are located transverse grooves 34, which have the shape and inclination of teeth 23 of bar 20. The rolls are spaced apart a distance which is approximately equal to the thickness of the bar 20 at edge 28. Shallow groove 33, however, is wider, and transverse grooves 34 are longer than the transverse dimension of the bar. Side guides 35 are used at the entering side of the roll, the guides fitting closely the entering material. Said guides 35 are so arranged that as the metal is formed by the roll, edge 28 of the bar will coincide with the right-hand edge (Fig. 4) 36 of groove 34. Side guides 37 are used at the exit side of the rolls. These are used merely as a precautionary measure. It will be apparent that by properly positioning guides 35 and 37, bars of various widths can be rolled from the same pass. This results from the fact that grooves 34 extend beyond the edge of the material, and that no attempt is made in the rolls to form either edge of the bar. If, therefore, a larger bar is used to start with, one of each of the guides 35 and 37 will be shifted downward (Fig. 5) and the excess material will merely flow laterally a greater distance and produce a wider cylinder bar. The left-hand edge (Fig. 4) of the bar will assume a rounded shape in accordance with the dictates of the forces within the metal. This I consider to be an important feature of my invention.

Above cylinder bar 20 as it leaves the rolls is located a stripper 38 and below the bar 20 a delivery guide 38' is used. This stripper is used mainly to start the bar properly, and after the bar has once been pried from upper roll 32, no difficulty is experienced in causing it to leave the roll in a horizontal direction thereafter. The rolls are rotated in a direction which is such that the narrow portion of the tooth is formed first. It is, therefore, a relatively simple problem to strip the bar from roll 32, since the stripper 38 will first contact the small end of the tooth and will meet with less resistance than it would were it to contact the heavy portion of the tooth first.

The method is carried out as follows: A bar having a cross section of a regular polygon, heated to rolling temperature, is fed between side guides 35 to rolls 31 and 32. As forming roll 32 contacts the bar, teeth 23 are formed in the upper surface thereof, with the metal flowing freely in a lateral direction during the forming operation. As the bar leaves the rolls, stripper 38 contacts the surface of the teeth 23 and strips the bar from the upper roll, thereby causing it to pass between side guides 37 in substantially the same direction in which it enters. As the teeth are formed, however, the symmetrical stock is free to rotate about its own axis between side guides 35. This, however, does no harm since the unformed portion of the bar is a regular polygon and presents substantially the same contour to the rolls regardless of the angle of the polygon with respect thereto. This, of course, is particularly true where the polygon is a circle.

The unformed bar may be purchased from any steel mill, or preferably it will be formed in a rolling mill, and while still hot, will be passed into the mill containing rolls 31 and 32, thereby forming cylinder bar 20 in a single heat and saving the cost of reheating the material.

Figs. 6 to 10 show a few of the typical sections which may be used for the starting material. It will be observed that the basic characteristic of these sections is substantial symmetry about horizontal and vertical axes.

Fig. 6 is a round section which I have found to be preferable. Fig. 7 is a hexagon which will also result in a satisfactory bar, for regardless of the angle at which the bar enters the rolls, sufficient material will be located centrally of the bar to fill transverse grooves 34 without leaving an excess of material on the sides. Fig. 8 is an octagon which will also give a substantially satisfactory bar. Fig. 9 is a square with large radius corners so that it approximates a circle. Fig. 10 is a circle with a flat. Other sections approximating a circle, such as ovals, may also be used. Each of these shapes will give varied degrees of satisfaction depending upon how closely it approximates a round.

As an example of the amount of deformation effected by the rolling operation, a round bar having a diameter of one and one-eighth inches will result in a cylinder bar one and three-quarter inches wide and five-eighths of an inch over all maximum thickness.

It is understood that the foregoing description is merely illustrative of a preferred form of the invention, and that the scope of the invention, therefore, is not intended to be limited thereto, but is to be determined by the appended claims.

I claim:

1. The method of forming an agricultural implement cylinder beater bar or the like, said bar having an unsymmetrical cross section defined by a flat back face disposed in a single plane and an opposite face having teeth protruding therefrom and disposed at an acute angle to the axis of said bar, the thickness of said bar being only a fraction of the width thereof, said teeth varying in height and thickness from one extremity on one side of said bar to the other side of said bar, said method comprising employing a bar metal stock having a substantially symmetrical cross section all the radii of which are substantially of equal length, passing said stock between a pair of compressing and forming rolls, one of which rolls is formed with a recess die in the face thereof corresponding to said opposite face and teeth of said bar and guiding said symmetrical stock to said rolls while allowing free turning of the unformed stock about the axis thereof while maintaining the discharged flat back face substantially in its normal plane, the metal of said stock being pressed into said recess die and caused to flow in a generally axial direction with reference to the faces of said rolls after said die recess has been filled to thus produce a bar of generally flat or elongated unsymmetrical cross section from said symmetrical cross section stock.

2. The method of forming an agricultural implement cylinder beater bar or the like, said bar having an unsymmetrical cross section defined by a flat back face disposed in a single plane and an opposite face having teeth protruding therefrom and disposed at an acute angle to the axis of said bar, the thickness of said bar being only a fraction of the width thereof, said teeth varying in height and thickness from one extremity on one side of said bar to the other side of said bar, said method comprising employing a bar metal stock having a substantially symmetrical cross section all the radii of which are substantially of equal length, heating said stock to forging temperature, passing said stock between a pair of compressing and forming rolls, one of which rolls is formed with a recess die in the face thereof corresponding to said opposite face and teeth of said bar and guiding said symmetrical stock to said rolls while allowing free turning of the unformed stock about the axis thereof while maintaining the discharged flat back face substantially in its normal plane, the metal of said stock being pressed into said recess die and caused to flow in a generally axial direction with reference to the faces of said rolls after said die recess has been filled to thus produce a bar of generally flat or elongated unsymmetrical cross section from said symmetrical cross section stock.

LOUIS OLIVIERI.